United States Patent
Abe

(10) Patent No.: US 9,369,019 B1
(45) Date of Patent: Jun. 14, 2016

(54) SPINDLE MOTOR AND DISK DRIVE APPARATUS

(71) Applicant: Nidec Corporation, Kyoto (JP)

(72) Inventor: Hiroyuki Abe, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 14/835,932

(22) Filed: Aug. 26, 2015

(30) Foreign Application Priority Data

Dec. 26, 2014 (JP) ................................ 2014-266518

(51) Int. Cl.
*G11B 17/02* (2006.01)
*H02K 3/28* (2006.01)
*H02K 7/08* (2006.01)
*G11B 19/20* (2006.01)

(52) U.S. Cl.
CPC ........ *H02K 3/28* (2013.01); *G11B 17/02* (2013.01); *G11B 19/2009* (2013.01); *H02K 7/086* (2013.01)

(58) Field of Classification Search
CPC ........................................................ G11B 17/02
USPC ................................ 360/99.08, 99.12, 99.06
See application file for complete search history.

(56) References Cited

U.S. PATENT DOCUMENTS

| 5,508,578 | A | 4/1996 | Suzuki et al. |
| 8,400,729 | B1 * | 3/2013 | Watanabe .......... G11B 19/2009 360/99.08 |
| 8,908,324 | B1 * | 12/2014 | Taki ......................... H02K 3/28 360/99.08 |
| 2011/0096437 | A1 | 4/2011 | Nagai et al. |
| 2012/0200182 | A1 | 8/2012 | Park |

FOREIGN PATENT DOCUMENTS

| JP | 07-59316 A | 3/1995 |
| JP | 07-59317 A | 3/1995 |
| JP | 2001-069717 A | 3/2001 |
| JP | 2002-101606 A | 4/2002 |
| JP | 2005-110462 A | 4/2005 |
| JP | 2012-165628 A | 8/2012 |

* cited by examiner

*Primary Examiner* — Allen T Cao
(74) *Attorney, Agent, or Firm* — Keating & Bennett, LLP

(57) ABSTRACT

A spindle motor includes a stationary portion and a rotating portion arranged to rotate about a central axis extending in a vertical direction with respect to the stationary portion. The stationary portion includes a stator portion including a stator core including an annular core back and a plurality of tooth portions arranged to extend radially outward from the core back, and coils wound around the plurality of tooth portions; an outside surface press fitted to an inside surface of the core back; and a fixing member arranged at least on an upper surface of the core back. Conducting wires defining the coils include passage lines each of which is arranged to join different ones of the coils to each other; and lead wires each of which is drawn out from one of the coils, and is drawn out from an upper side of upper surfaces of the tooth portions to a lower side of lower surfaces of the tooth portions.

19 Claims, 8 Drawing Sheets

SPINDLE MOTOR AND DISK DRIVE APPARATUS

BACKGROUND OF THE INVENTION

1. Field of the Invention

The present invention relates to a spindle motor and a disk drive apparatus.

2. Description of the Related Art

A disk drive apparatus, such as, for example, a hard disk drive, includes a spindle motor arranged to rotate a recording disk. A stator core assembly described in JP-A 2012-165628 includes a core back joined to a stationary member, and at least one tooth portion arranged to project from the core back and around which a conducting wire is wound. A passage line of the conducting wire is arranged on the core back. After the conducting wire is wound around the tooth portion, a lead wire, which is an end portion of the conducting wire, is arranged to pass axially below the tooth portion.

The conducting wire described in JP-A 2012-165628 is wound in a counterclockwise direction around the tooth portion a plurality of times. Thereafter, the lead wire is drawn out axially downwardly of the tooth portion. If a looseness of the lead wire occurs, the lead wire will rise above a coil, bringing the lead wire into contact with the rotating member. If a contact between the lead wire and the rotating member occurs, the lead wire may be damaged, and even a breaking of the lead wire may occur. In addition, the passage line is arranged on the core back. If the passage line lies on an inner portion of the core back, an unwanted biting of the passage line may occur when the stator core assembly is joined to the stationary member.

SUMMARY OF THE INVENTION

A spindle motor according to a preferred embodiment of the present invention includes a stationary portion and a rotating portion arranged to rotate about a central axis extending in a vertical direction with respect to the stationary portion. The stationary portion includes a stator portion including a stator core including an annular core back and a plurality of tooth portions arranged to extend radially outward from the core back, and coils wound around the plurality of tooth portions; an outside surface press fitted to an inside surface of the core back; and a fixing member arranged at least on an upper surface of the core back. Conducting wires defining the coils include passage lines each of which is arranged to join different ones of the coils to each other; and lead wires each of which is drawn out from one of the coils, and is drawn out from an upper side of upper surfaces of the tooth portions to a lower side of lower surfaces of the tooth portions. Each of the passage lines and the lead wires is arranged radially outward of the inside surface of the core back. The fixing member is arranged to fix at least a portion of each passage line and at least a portion of each lead wire to the stator core.

According to the above preferred embodiment of the present invention, a movement of each of the lead wires and the passage lines of the conducting wires can be minimized.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. Note that the scope of the present invention is not limited to the preferred embodiments described below, but includes any modification thereof within the scope of the technical idea of the present invention. Also note that scales, numbers, and so on of members or portions illustrated in the following drawings may differ from those of actual members or portions, for the sake of easier understanding of the members or portions.

In the following drawings, an xyz coordinate system is shown appropriately as a three-dimensional orthogonal coordinate system. In the xyz coordinate system, a z-axis direction is assumed to be a direction parallel to a central axis J extending in a vertical direction in FIG. 1. A y-axis direction is assumed to be a direction perpendicular to a z-axis. An x-axis direction is assumed to be a direction perpendicular to both the z-axis and a y-axis. Note that the wording "parallel direction" as used herein comprehends both parallel and substantially parallel directions. Also note that the wording "perpendicular" as used herein comprehends both "perpendicular" and "substantially perpendicular".

Also note that, in the following description, a positive side (i.e., a +z side) in the z-axis direction will be referred to as an "upper side", and a negative side (i.e., a −z side) in the z-axis direction will be referred to as a "lower side". It should be noted, however, that the above definitions of the vertical direction and the upper and lower sides are not meant to indicate relative positions or directions of different members or portions when those members or portions are actually installed in a device. Also note that, in the following description, the relative positions of different members or portions and positions of the members and the portions will be defined based on the central axis J. Unless otherwise specified, the direction parallel to the central axis J (i.e., the z-axis direction) will be simply referred to by the term "axial direction", "axial", or "axially", radial directions centered on the central axis J will be simply referred to by the term "radial direction", "radial", or "radially", and a circumferential direction about the central axis J will be simply referred to by the term "circumferential direction", "circumferential", or "circumferentially".

1. First Preferred Embodiment

Figure 1:
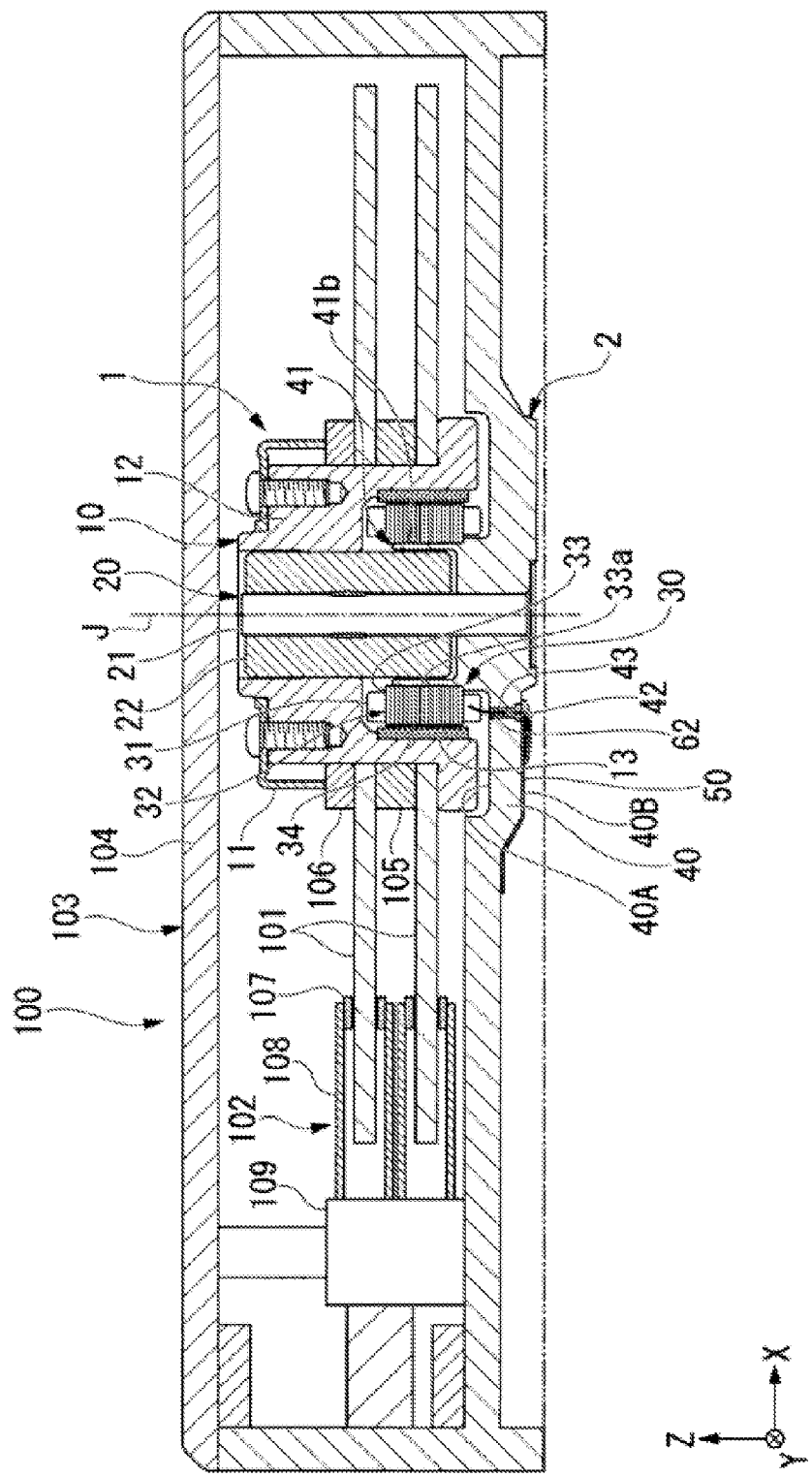
FIG. 1 is a vertical cross-sectional view illustrating a disk drive apparatus including a spindle motor according to a preferred embodiment of the present invention.

FIG. 1 is a vertical cross-sectional view illustrating a disk drive apparatus 100 including a spindle motor 1 according to a preferred embodiment of the present invention.

The disk drive apparatus 100 is a hard disk drive. The disk drive apparatus 100 includes the spindle motor 1, disks 101, and an access portion 102. The spindle motor 1 is arranged to rotate the disks 101, on which information is recorded, about the central axis J. The access portion 102 is arranged to perform at least one of reading and writing of information from or to the disks 101.

The disk drive apparatus 100 includes a housing 103. The housing 103 includes a base portion 40 of the spindle motor 1, and a cover member 104. The cover member 104 is fitted to an opening of the base portion 40 to define the housing 103. The disks 101 and the access portion 102 are accommodated in the housing 103. An interior space of the housing 103 is filled with, for example, a helium gas. Note that the interior space of the housing 103 may alternatively be filled with a hydrogen gas, air, or the like.

The disk drive apparatus 100 includes the plurality of disks 101. The disk drive apparatus 100 includes a spacer 105 arranged between the disks 101. The plurality of disks 101 are supported by the spindle motor 1. More specifically, the plurality of disks 101 are supported by a rotating portion 10 of the spindle motor 1. The rotating portion 10 includes a clamp member 11 arranged to support the plurality of disks 101. The disk drive apparatus 100 includes a spacer 106 arranged between the clamp member 11 and the disks 101. The plurality of disks 101 are arranged to rotate about the central axis J together with the rotating portion 10.

The access portion 102 includes heads 107, arms 108, and a head actuator mechanism 109. Each of the heads 107 is arranged in close proximity to a surface of one of the disks 101 to magnetically perform at least one of the reading and the writing of information. Each head 107 is supported by an associated one of the arms 108. Each arm 108 is supported by the head actuator mechanism 109.

The spindle motor 1 includes a stationary portion 2 and the rotating portion 10, which is arranged to rotate about the central axis J extending in the vertical direction with respect to the stationary portion 2. The stationary portion 2 includes an outside surface 41b described below, a shaft 21 of a bearing portion 20, a stator portion 30, the base portion 40, and a circuit board 50. The rotating portion 10 includes a sleeve 22 of the bearing portion 20, the clamp member 11, a rotor hub 12, and a rotor magnet 13.

The bearing portion 20 is arranged to support the rotor hub 12 such that the rotor hub 12 is rotatable about the central axis J. The bearing portion 20 includes the shaft 21 and the sleeve 22. The shaft 21 is fixed to the base portion 40. The shaft 21 and the sleeve 22 are arranged opposite to each other with a gap intervening therebetween. A lubricating oil or a gas is arranged in the gap.

The stator portion 30 includes coils 31 and a stator core 32. Each coil 31 is arranged opposite to the rotor magnet 13 with a gap intervening therebetween. The stator core 32 is a laminated structure defined by laminated magnetic bodies. The stator core 32 includes an annular core back 33 and a plurality of tooth portions 34. The tooth portions 34 are arranged to extend radially outward from the core back 33. Each coil 31 is wound around a separate one of the tooth portions 34.

The base portion 40 includes an upper surface 40A and a lower surface 40B. The base portion 40 is arranged to support the stator portion 30 on the upper surface 40A. The upper surface 40A is a surface facing an inside of the housing 103.

The base portion 40 includes a cylindrical portion 41 and base portion through holes 42. The cylindrical portion 41 is arranged on the upper surface 40A of the base portion 40. The cylindrical portion 41 is preferably tubular, extending in an axial direction. As mentioned above, the stationary portion 2 includes the outside surface 41b, and more specifically, the cylindrical portion 41 includes the outside surface 41b, which is press fitted to an inside surface 33a of the core back 33. A wall surface of the stationary portion 2 which constitutes the outside surface 41b will be hereinafter referred to as the outside surface 41b of the cylindrical portion 41. Note that the cylindrical portion 41 may not necessarily be tubular, but may alternatively be, for example, polygonal. Also note that the inside surface 33a may or may not be an annular circumferential surface, and may be, for example, polygonal.

Each base portion through hole 42 is arranged to pass through the base portion 40 from the upper surface 40A to the lower surface 40B thereof. The lower surface 40B is a surface facing an outside of the housing 103. Through the base portion through holes 42, lead wires 62 from the coils 31 are arranged to pass. The spindle motor 1 includes a sealant 43 arranged to fill a gap between each base portion through hole 42 and the lead wire 62. The circuit board 50 is arranged on the lower surface 40B of the base portion 40. The circuit board 50 is connected with the lead wires 62, which are drawn out below the lower surface 40B through the base portion through holes 42.

Figure 2:
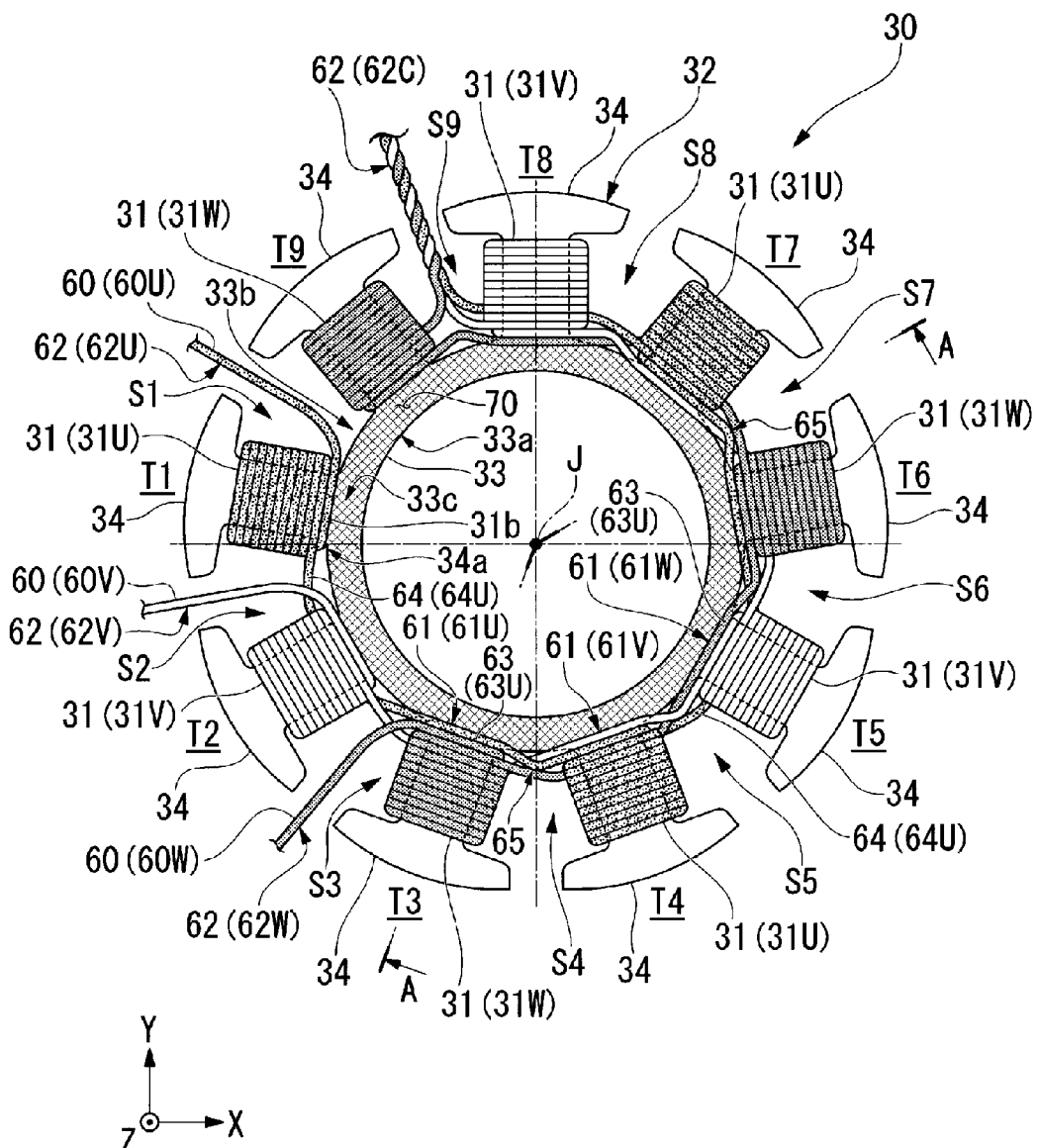
FIG. 2 is a plan view illustrating a stator portion according to the above preferred embodiment of the present invention.

FIG. 2 is a plan view illustrating the stator portion 30 according to the present preferred embodiment.

The number of tooth portions 34 included in the stator portion 30 is nine. The coils 31 are made up of three coil groups each of which includes three coils wound around separate ones of the nine tooth portions 34. The three coil groups are a U phase group, a V phase group, and a W phase group. The coils 31 of the U phase group will be hereinafter referred to as coils 31U. The coils 31 of the V phase group will be hereinafter referred to as coils 31V. The coils 31 of the W phase group will be hereinafter referred to as coils 31W.

Figure 3:
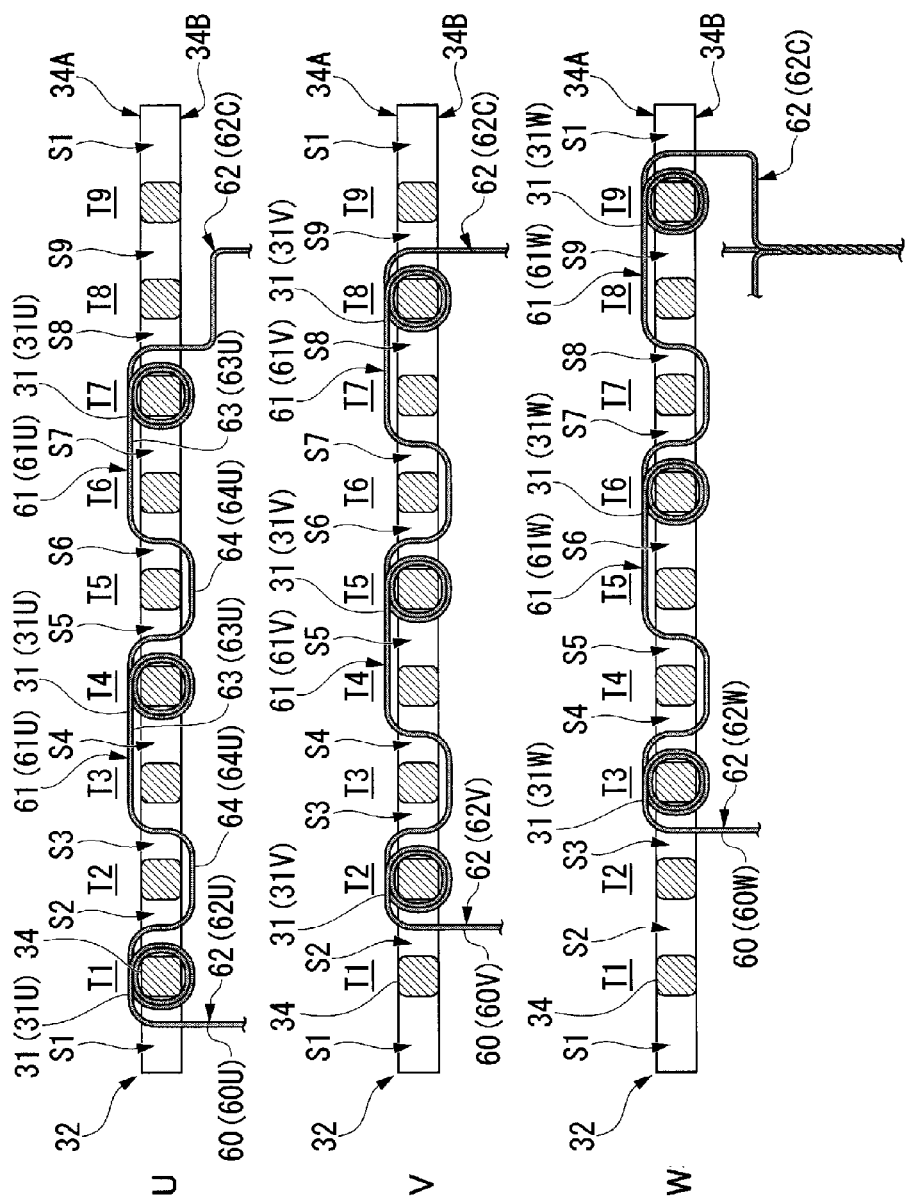
FIG. 3 is a diagram illustrating winding patterns of conducting wires according to the above preferred embodiment of the present invention.

In each of the three coil groups, a single conducting wire 60 defines the three coils 31. Each conducting wire 60 is an enameled wire including an insulating coating. The conducting wires 60 include passage lines 61 and the lead wires 62. The conducting wires 60 are wound around the tooth portions 34. Each coil 31 is defined by turns of the conducting wire 60 forming multiple layers arranged one above another in the axial direction around a corresponding one of the tooth portions 34. The conducting wire 60 is wound around each tooth portion 34 first from a radially inner end portion 34a thereof. The conducting wire 60 is wound around the tooth portion 34 first from the radially inner end portion 34a toward a radially outer end portion of the tooth portion 34 and then from the radially outer end portion toward the radially inner end portion 34a. Winding of the conducting wire 60 is finished in the vicinity of the radially inner end portion 34a of the tooth portion 34. Therefore, the number of layers of the turns of the conducting wire 60 around each tooth portion 34 is preferably an even number, for example, four. Each lead wire 62 is arranged radially outward of the inside surface 33a of the core back 33. Each lead wire 62 is drawn out from one of the coils 31, and is drawn out from an upper side of upper surfaces 34A of the tooth portions 34 to a lower side of lower surfaces 34B of the tooth portions 34 as illustrated in FIG. 3, which will be described below. Moreover, the lead wire 62 is drawn out from the upper side of the upper surfaces 34A of the tooth portions 34 to the lower side of the lower surfaces 34B of the tooth portions 34 at the radially inner end portion 34a of one of the tooth portions 34.

Of the conducting wires 60 which define the coils 31, the conducting wire 60 which defines the coils 31U will be hereinafter referred to as a conducting wire 60U. The conducting wire 60 which defines the coils 31V will be hereinafter referred to as a conducting wire 60V. The conducting wire 60 which defines the coils 31W will be hereinafter referred to as a conducting wire 60W. One end portion of the conducting wire 60U is drawn out as a lead wire 62U. One end portion of the conducting wire 60V is drawn out as a lead wire 62V. One end portion of the conducting wire 60W is drawn out as a lead wire 62W.

Opposite end portions of the conducting wires 60U, 60V, and 60W are twisted together and drawn out as a single common wire. The common wire will be hereinafter referred to as a lead wire 62C. Thus, the number of lead wires 62 drawn out from the stator core 32 is four. Each of the four lead wires 62 is drawn out through a different slot. Each of slots S1, S2, S3, S4, S5, S6, S7, S8, and S9 is defined between adjacent ones of the tooth portions 34. The lead wire 62U is drawn out through the slot S1. The lead wire 62V is drawn out through the slot S2. The lead wire 62W is drawn out through the slot S3. The lead wire 62C is drawn out through the slot S9.

FIG. 3 is a diagram illustrating a winding pattern of each conducting wire 60 according to the present preferred embodiment. In FIG. 3, the annular stator core 32 is developed into a straight line. In the following description, the tooth portions 34 illustrated in FIG. 3 will be referred to using numbers assigned thereto. As illustrated in FIG. 3, symbols "T1" to "T9" are assigned to the first to ninth tooth portions 34, respectively.

As illustrated in FIG. 3, the conducting wire 60U is wound around the first tooth portion 34, the fourth tooth portion 34, and the seventh tooth portion 34.

Each passage line 61, which is arranged to join different ones of the coils 31 to each other, includes a first line portion 63 and a second line portion 64. The first line portion 63 is arranged to pass only on the upper side of the upper surfaces 34A of adjacent ones of the tooth portions 34. The second line portion 64 is arranged to extend on both the upper side of the upper surfaces 34A of adjacent ones of the tooth portions 34 and the lower side of the lower surfaces 34B of the adjacent ones of the tooth portions 34, and is arranged to pass below the lower surface 34B of one of the tooth portions 34. The conducting wire 60U includes a passage line 61U which is arranged to join the coil 31U of the first tooth portion 34 and the coil 31U of the fourth tooth portion 34 to each other. A second line portion 64U of the passage line 61U starts at a position above the upper surface 34A of the first tooth portion 34.

The second line portion 64U is arranged to pass through the slot S2. The second line portion 64U is arranged to pass below the lower surface 34B of the second tooth portion 34 after passing through the slot S2. The second line portion 64U is arranged to pass through the slot S3 after passing below the lower surface 34B of the second tooth portion 34. The second line portion 64U is arranged to reach a position above the upper surface 34A of the third tooth portion 34 after passing through the slot S3. A first line portion 63U of the passage line 61U starts at the position above the upper surface 34A of the third tooth portion 34. The first line portion 63U is arranged to extend from the position above the upper surface 34A of the third tooth portion 34 to a position above the upper surface 34A of the fourth tooth portion 34.

In addition, the conducting wire 60U includes another passage line 61U, which is arranged to join the coil 31U of the fourth tooth portion 34 and the coil 31U of the seventh tooth portion 34 to each other. A second line portion 64U of the other passage line 61U starts at the position above the upper surface 34A of the fourth tooth portion 34. The second line portion 64U is arranged to pass through the slot S5. The second line portion 64U is arranged to pass below the lower surface 34B of the fifth tooth portion 34 after passing through the slot S5. The second line portion 64U is arranged to pass through the slot S6 after passing below the lower surface 34B of the fifth tooth portion 34. The second line portion 64U is arranged to reach a position above the upper surface 34A of the sixth tooth portion 34 after passing through the slot S6.

A first line portion 63U of the other passage line 61U starts at the position above the upper surface 34A of the sixth tooth portion 34. The first line portion 63U is arranged to extend from the position above the upper surface 34A of the sixth tooth portion 34 to a position above the upper surface 34A of the seventh tooth portion 34. The opposite end portion of the conducting wire 60U, which defines a portion of the lead wire 62C, is drawn out from the position above the upper surface 34A of the seventh tooth portion 34 downwardly of the lower surface 34B of the seventh tooth portion 34. The opposite end portion of the conducting wire 60U, which defines the portion of the lead wire 62C, will be hereinafter referred to as a lead wire 62C of the conducting wire 60U. The lead wire 62C is arranged to pass through the slot S8.

The lead wire 62C is arranged to pass below the lower surface 34B of the eighth tooth portion 34 after passing through the slot S8. After passing below the lower surface 34B of the eighth tooth portion 34, the lead wire 62C is twisted into the single common wire together with the opposite end portions of the conducting wires 60V and 60W below the slot S9. On the other hand, the one end portion of the conducting wire 60U, which defines the lead wire 62U, is drawn out from the position above the upper surface 34A of the first tooth portion 34 downwardly of the lower surface 34B of the first tooth portion 34. The lead wire 62U is arranged to pass through the slot S1.

A winding pattern of the conducting wire 60V is substantially the same as a winding pattern of the conducting wire 60U. As illustrated in FIG. 3, the conducting wire 60V is wound around the second tooth portion 34, which is adjacent to the coil 31U of the first tooth portion 34. The conducting wire 60V includes passage lines 61V between the coil 31V of the second tooth portion 34 and the coil 31V of the fifth tooth portion 34, and between the coil 31V of the fifth tooth portion 34 and the coil 31V of the eighth tooth portion 34.

The opposite end portion of the conducting wire 60V, which defines a portion of the lead wire 62C, is drawn out from a position above the upper surface 34A of the eighth tooth portion 34 downwardly of the lower surface 34B of the eighth tooth portion 34. The opposite end portion of the conducting wire 60V, which defines the portion of the lead wire 62C, will be hereinafter referred to as a lead wire 62C of the conducting wire 60V. The lead wire 62C is arranged to pass through the slot S9. After passing through the slot S9, the lead wire 62C is twisted into the single common wire together with the opposite end portions of the conducting wires 60U and 60W below the slot S9. On the other hand, the one end portion of the conducting wire 60V, which defines the lead wire 62V, is drawn out from a position above the upper surface 34A of the second tooth portion downwardly of the lower surface 34B of the second tooth portion 34. The lead wire 62V is arranged to pass through the slot S2. The winding pattern of the conducting wire 60V is otherwise similar to the winding pattern of the conducting wire 60U.

Further, a winding pattern of the conducting wire 60W is substantially the same as the winding pattern of each of the conducting wires 60U and 60V. As illustrated in FIG. 3, the conducting wire 60W is wound around the third tooth portion 34, which is adjacent to the coil 31V of the second tooth portion 34. The conducting wire 60W includes passage lines 61W between the coil 31W of the third tooth portion 34 and the coil 31W of the sixth tooth portion 34, and between the coil 31W of the sixth tooth portion 34 and the coil 31W of the ninth tooth portion 34.

The opposite end portion of the conducting wire 60W, which defines a portion of the lead wire 62C, is drawn out from a position above the upper surface 34A of the ninth tooth portion 34 downwardly of the lower surface 34B of the ninth tooth portion 34. The opposite end portion of the conducting wire 60W, which defines the portion of the lead wire 62C, will be hereinafter referred to as a lead wire 62C of the conducting wire 60W. The lead wire 62C is arranged to pass through the slot S1. The lead wire 62C is arranged to pass below the lower surface 34B of the ninth tooth portion 34 after passing through the slot S1. After passing below the lower surface 34B of the ninth tooth portion 34, the lead wire 62C is twisted into the single common wire together with the opposite end portions of the conducting wires 60U and 60V below the slot S9. On the other hand, the one end portion of the conducting wire 60W, which defines the lead wire 62W, is drawn out from the position above the upper surface 34A of the third tooth portion 34 downwardly of the lower surface 34B of the third tooth portion 34. The lead wire 62W is arranged to pass through the slot S3. The winding pattern of the conducting wire 60W is otherwise similar to the winding pattern of each of the conducting wires 60U and 60V.

As illustrated in FIG. 2, each passage line 61 is arranged radially outward of the inside surface 33a of the core back 33. The second line portion 64 of each passage line 61 is arranged to extend from above the upper surface 34A of an adjacent one of the tooth portions 34 downwardly of the lower surface 34B of the adjacent tooth portion 34, and to extend from below the lower surface 34B of another adjacent one of the tooth portions 34 upwardly of the upper surface 34A of the other adjacent tooth portion 34. Thus, the second line portion 64 is arranged radially outward of an outside surface 33b of the core back 33. Meanwhile, at least a portion of the first line portion 63 of each passage line 61 is arranged radially outward of the outside surface 33b of the core back 33. A remaining portion of the first line portion 63 is arranged on an upper surface 33c of the core back 33.

The first line portion 63 is arranged to pass only on the upper side of the upper surfaces 34A of adjacent ones of the tooth portions 34, and, unlike the second line portion 64, does not pass below the lower surface 34B of any tooth portion 34. For example, when one of the first line portions 63U extends from the sixth tooth portion 34 to the seventh tooth portion 34, the first line portion 63U approaches the inside surface 33a of the core back 33. According to the present preferred embodiment, each first line portion 63 includes an angled portion 65 arranged radially outward of the outside surface 33b of the core back 33. The angled portion 65 is bent at an obtuse angle. The angled portion 65 is arranged at one of the slots.

Because of the angled portion 65, a portion of the first line portion 63 is arranged radially outward of the outside surface 33b of the core back 33. Thus, the first line portion 63 is arranged radially outward of the inside surface 33a of the core back 33. A winding jig (not shown) is arranged at the slot and between the first line portion 63 and the outside surface 33b of the core back 33 when the conducting wire 60 is wound. The winding jig is preferably in the shape of a rod, and is arranged to extend in the axial direction. After passing the sixth tooth portion 34, the first line portion 63 extends to the seventh tooth portion 34 while making contact with an outer surface of the winding jig. After reaching the seventh tooth portion 34, the conducting wire 60 is wound around the seventh tooth portion 34. After winding of the conducting wire 60 is finished, the winding jig is removed in the axial direction, completing the first line portion 63 including the angled portion 65.

Referring to FIG. 2, the stationary portion 2 includes a fixing member 70. The fixing member 70 is arranged at least on the upper surface 33c of the core back 33. The fixing member 70 is arranged to fix at least a portion of each passage line 61 and at least a portion of each lead wire 62 to the stator core 32. The fixing member 70 is arranged to extend over substantially the entire area of the upper surface 33c of the core back 33. Note that the fixing member 70 may alternatively be arranged away from the inside surface 33a of the core back 33 by a predetermined distance. For example, the fixing member 70 may alternatively be arranged to extend over a radially outer half of the upper surface 33c of the core back 33.

Figure 4:
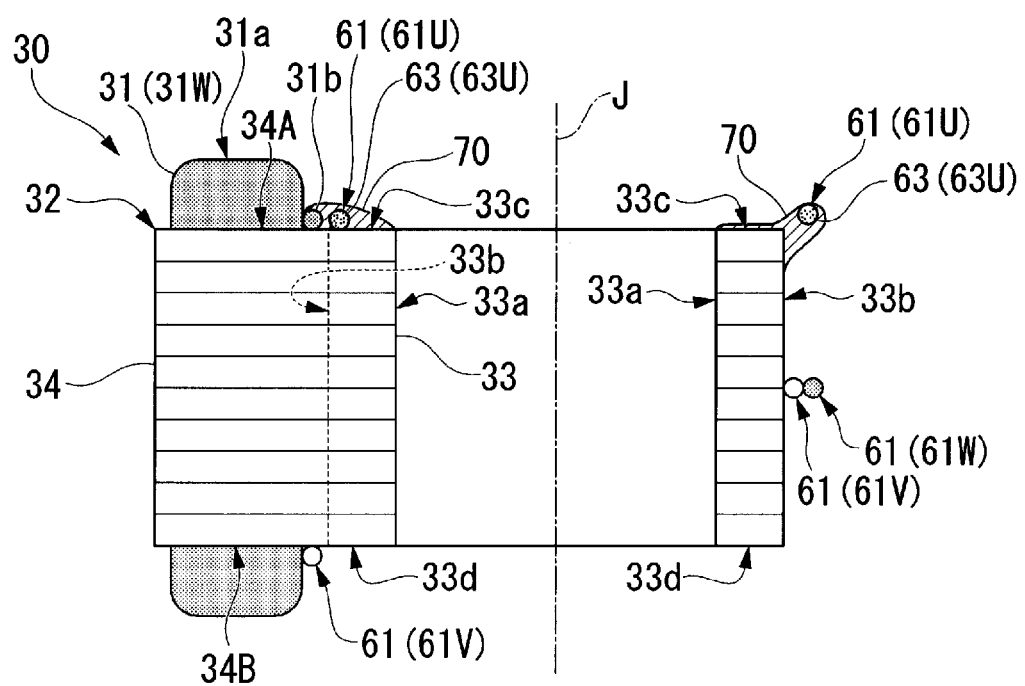
FIG. 4 is a vertical cross-sectional view illustrating a fixing member according to the above preferred embodiment of the present invention.

FIG. 4 is a vertical cross-sectional view illustrating the fixing member 70 according to the present preferred embodiment. FIG. 4 is a cross-sectional view taken along line A-A in FIG. 2.

The fixing member 70 is preferably made of a resin material. The fixing member 70 is made of, for example, a thermosetting adhesive. The fixing member 70 is arranged to extend from the upper surface 33c of the core back 33 to the outside surface 33b of the core back 33. A top of a portion of the fixing member 70 which is arranged above the upper surface 33c of the core back 33 is arranged at a level lower than that of an upper end portion 31a of each coil 31. Thus, the axial dimension of the rotating portion 10 can be reduced as illustrated in FIG. 1. Thus, the size of the entire spindle motor 1 can be reduced. Note that the fixing member 70 may not necessarily be made of the thermosetting adhesive, but may alternatively be made of another adhesive, such as, for example, a UV-curing adhesive.

Referring to FIG. 4, the fixing member 70 is arranged to fix a radially inner end portion 31b of each coil 31 to the stator core 32. The fixing member 70 is arranged to be in close contact with each tooth portion 34 and the radially inner end portion 31b of each coil 31. Referring to FIG. 2, the radially inner end portion 31b of the coil 31U wound around the first tooth portion 34, for example, is continuous with the lead wire 62U. The lead wire 62U is fixed to the stator core 32 through the radially inner end portion 31b of the coil 31U. Looseness of the lead wire 62U can thus be minimized.

A looseness of the lead wire might cause a contact between the lead wire and the rotating portion 10 with the lead wire rising above the coil. However, a contact between the lead wire 62U and the rotating portion 10 can be prevented by minimizing the looseness of the lead wire 62U. Thus, a damage to and a breaking of the lead wire 62U can be prevented. Note that looseness of the other lead wires 62V, 62W, and 62C can also be minimized in similar manners.

In addition, the fixing member 70 is arranged to fix at least a portion of the first line portion 63 to the stator core 32 as illustrated in FIG. 4. The fixing member 70 is arranged to fix a portion of the first line portion 63 which is arranged on the upper surface 33c of the core back 33. That is, the fixing member 70 is arranged to be in close contact with the upper surface 33c of the core back 33 and the first line portion 63. This contributes to preventing the first line portion 63 from moving radially inward above the upper surface 33c of the core back 33. This in turn prevents a movement of the first line portion 63 from causing a biting of the first line portion 63 by a press-fitting jig, i.e., a contact between the first line portion 63 and the press-fitting jig, when the stator core 32 is press fitted to the cylindrical portion 41. In addition, the fixing member 70 is arranged to fix a portion of the first line portion 63 which is arranged radially outward of the outside surface 33b of the core back 33.

Figure 5:
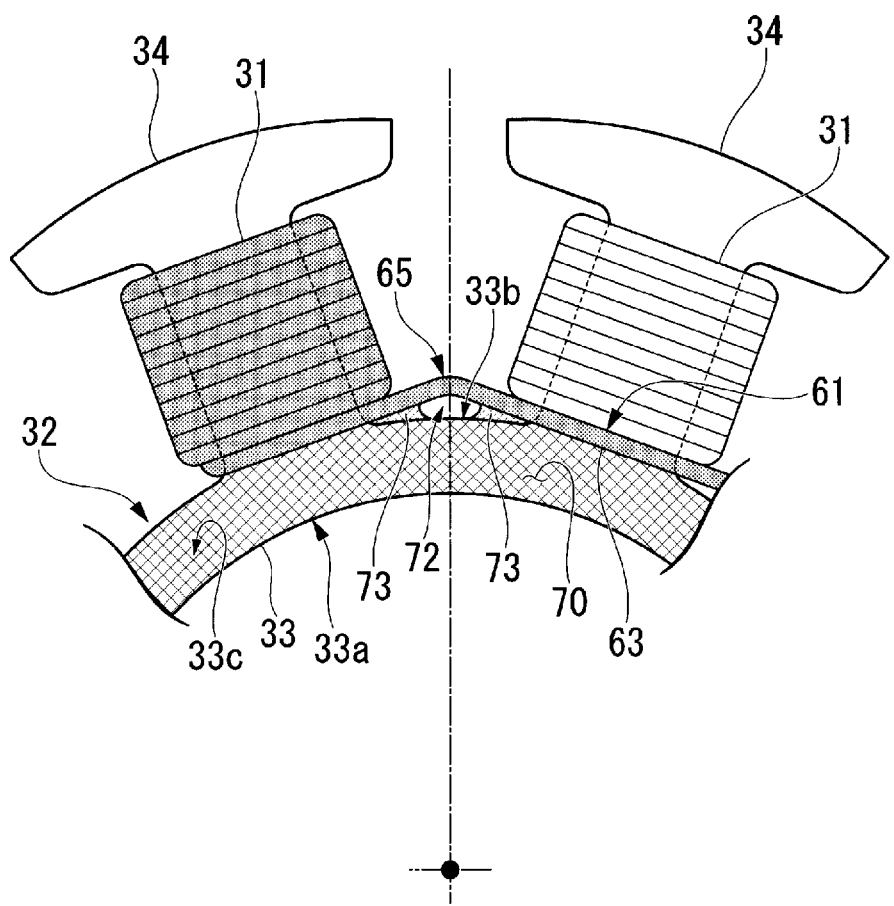
FIG. 5 is an enlarged plan view illustrating the fixing member according to the above preferred embodiment of the present invention.

FIG. 5 is an enlarged plan view illustrating a portion of the fixing member 70 according to the present preferred embodiment.

Referring to FIG. 5, at least a portion of the first line portion 63 is arranged radially outward of the outside surface 33b of the core back 33. A portion of the fixing member 70 is arranged in at least a portion of a gap 72 defined between the outside surface 33b of the core back 33 and the portion of the first line portion 63 which is arranged radially outward of the outside surface 33b. The fixing member 70 is made of the resin material, and accordingly includes thin films 73 each of which is arranged in the gap 72. Each film 73 of the fixing member 70 is arranged in an area where the outside surface 33b of the core back 33 and the first line portion 63 are adjacent to each other. Because a portion of the first line portion 63 is arranged to extend gradually farther away from the outside surface 33b of the core back 33 radially outwardly because of the angled portion 65 of the first line portion 63, a portion of the fixing member 70 tends to be easily held in the gap 72 by surface tension.

As illustrated in FIG. 4, the fixing member 70 is arranged to be in close contact with the upper surface 33c of the core back 33, the outside surface 33b of the core back 33, and each first line portion 63. This contributes to preventing the portion of the first line portion 63 which is arranged radially outward of the outside surface 33b of the core back 33 from moving radially inward. As each first line portion 63 is more easily moved than each second line portion 64, each first line portion 63 is arranged on the upper side (i.e., the +z side) as illustrated in FIG. 2. Accordingly, all the first line portions 63 can be collectively fixed by the fixing member 70, which is arranged at least on the upper surface 33c of the core back 33. In addition, it is possible to arrange the fixing member 70 over only a limited area. For example, referring to FIG. 4, the fixing member 70 does not need to be arranged on either the inside surface 33a of the core back 33 or the lower surface 33d of the core back 33. This leads to improved workability.

As described above, the fixing member 70 is arranged to fix at least a portion of each passage line 61 and at least a portion of each lead wire 62 to the stator core 32. This contributes to preventing the passage lines 61 and the lead wires 62 of the coils 31 from moving. Specifically, each passage line 61 can be prevented from moving radially inward above the upper surface 33c of the core back 33. This contributes to preventing a movement of the passage line 61 from causing a biting of the passage line 61 by the press-fitting jig, i.e., a contact between the passage line 61 and the press-fitting jig, when the stator core 32 is press fitted to the cylindrical portion 41. In addition, looseness of each lead wire 62 can be minimized. This contributes to preventing the lead wire 62 from making contact with the rotating portion 10. Thus, a damage to and a breaking of the lead wire 62 can be prevented. Further, because the fixing member 70 is arranged on the upper side of the stator core 32, the passage lines 61 and the lead wires 62 can be fixed on a reward side of the stator core 32 with respect to a direction in which the stator core 32 is moved to be press fitted to the cylindrical portion 41. Furthermore, even if any lead wire 62 is pushed upward from below after the lead wires 62 are passed through the respective base portion through holes 42, the fixing member 70 minimizes looseness of the lead wire 62.

Note that the present preferred embodiment can be modified in any of the following manners. In the following description, members or portions that have their equivalents in the above-described preferred embodiment are denoted by the same reference numerals as those of their equivalents in the above-described preferred embodiment, and descriptions thereof will be provided in brief or will be omitted.

Figure 6:
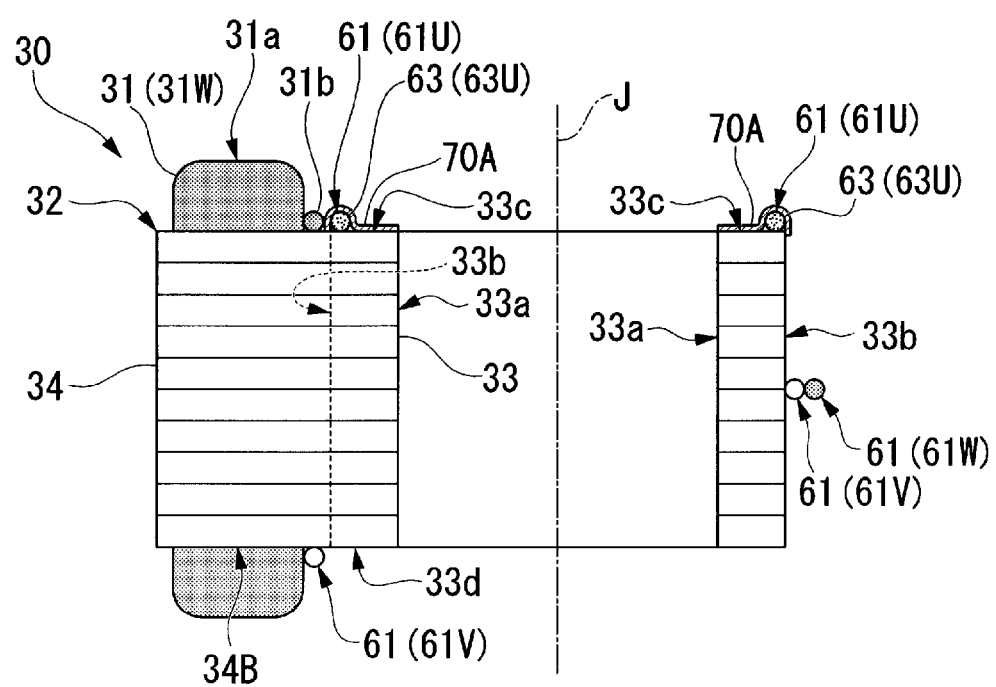
FIG. 6 is a vertical cross-sectional view illustrating a fixing member according to a modification of the above preferred embodiment of the present invention.

FIG. 6 is a vertical cross-sectional view illustrating a fixing member 70A according to a modification of the present preferred embodiment.

Referring to FIG. 6, the fixing member 70A includes a sheet component. The sheet component is preferably annular. The sheet component is made of a thermoplastic resin material. If the sheet component is heated, the sheet component is softened and is deformed in accordance with an upper surface 33c of a core back 33 and passage lines 61. As a result of the deformation of the sheet component, the sheet component is arranged to be in close contact with the upper surface 33c of the core back 33 and the passage lines 61. The sheet component contributes to preventing a first line portion 63 of each passage line 61 from moving radially inward. This in turn contributes to preventing a movement of the first line portion 63 from causing a biting of the passage line 61 by a press-fitting jig. In addition, lead wires 62 (not shown) are fixed by the sheet component together with the passage lines 61. Fixing of each lead wire 62 minimizes looseness of the lead wire 62. This contributes to preventing the lead wire 62 from making contact with a rotating portion 10. Thus, a damage to and a breaking of the lead wire 62 can be prevented.

Note that the lead wires 62 (not shown) may be fixed by an adhesive while the passage lines 61 are fixed by the sheet component. Also note that the sheet component may not necessarily be annular, but may be arranged to have any desirable shape. Also note that the number of sheet components may not necessarily be one, but may be more than one.

Figure 7:
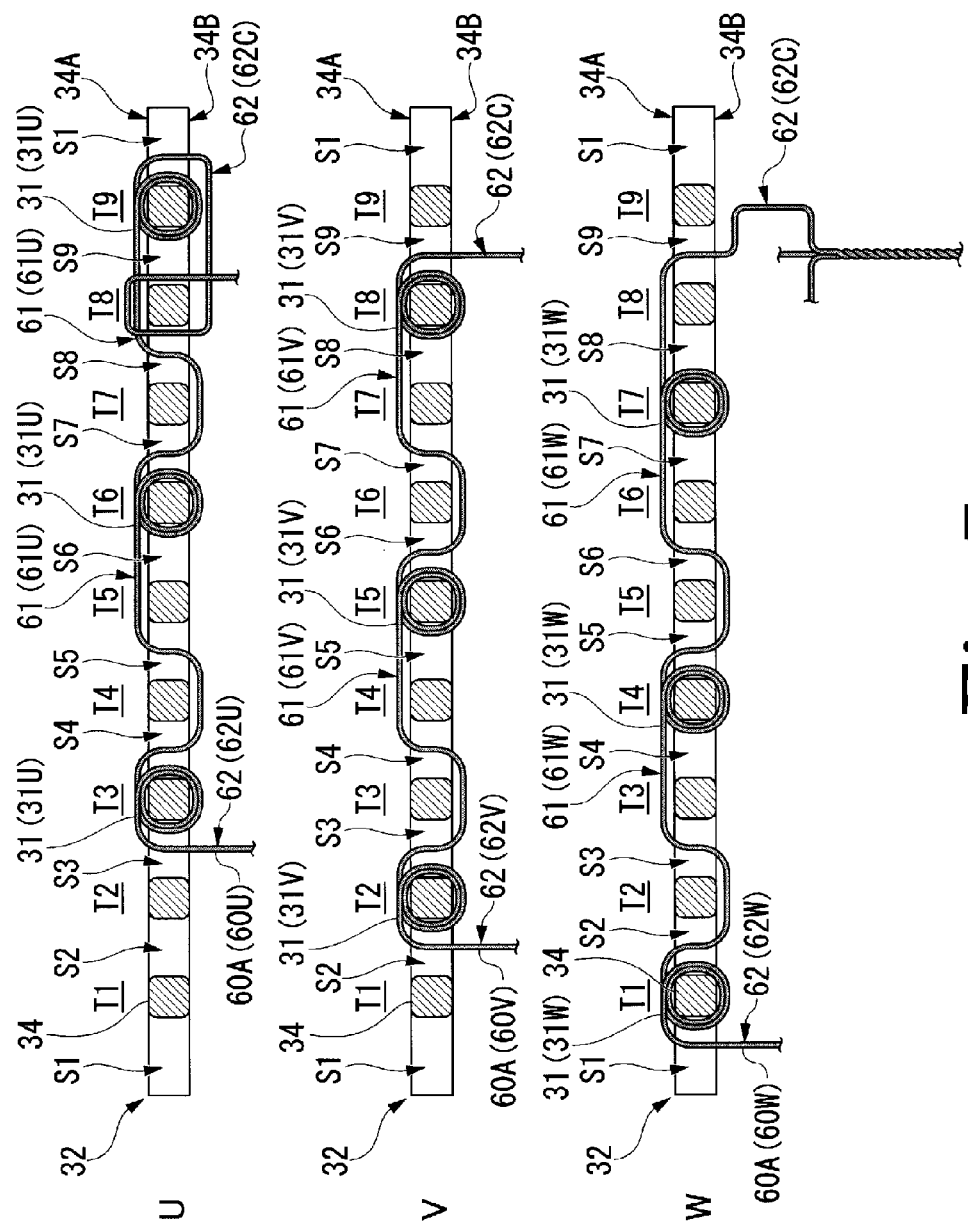
FIG. 7 is a diagram illustrating winding patterns of conducting wires according to a modification of the above preferred embodiment of the present invention.

FIG. 7 is a diagram illustrating winding patterns of conducting wires 60A according to a modification of the present preferred embodiment.

Referring to FIG. 7, in the winding patterns of the conducting wires 60A, a conducting wire 60U is first wound around a third tooth portion 34. Winding of the conducting wire 60U is finished at a ninth tooth portion 34. A lead wire 62C of the conducting wire 60U is arranged to pass through a slot S1. After passing through the slot S1, the lead wire 62C is arranged to pass below a lower surface 34B of the ninth tooth portion 34 back to below a lower surface 34B of an eighth tooth portion 34. After passing back to below the lower surface 34B of the eighth tooth portion 34, the lead wire 62C is arranged to pass through a slot S8. After passing through the slot S8, the lead wire 62C is arranged to pass above an upper surface 34A of the eighth tooth portion 34. After passing above the upper surface 34A of the eighth tooth portion 34, the lead wire 62C is arranged to pass through a slot S9. After passing through the slot S9, the lead wire 62C is twisted into a single common wire together with end portions of conducting wires 60V and 60W below the slot S9.

Meanwhile, the conducting wire 60V is first wound around a second tooth portion 34. Winding of the conducting wire 60V is finished at the eighth tooth portion 34. A lead wire 62C of the conducting wire 60V is arranged to pass through the slot S9. After passing through the slot S9, the lead wire 62C is twisted into the single common wire together with end portions of the conducting wires 60U and 60W below the slot S9.

Meanwhile, the conducting wire 60W is first wound around a first tooth portion 34. Winding of the conducting wire 60W is finished at a seventh tooth portion 34. A lead wire 62C of the conducting wire 60W is arranged to pass from a position above an upper surface 34A of the seventh tooth portion 34 to a position above the upper surface 34A of the eighth tooth portion 34. The lead wire 62C is arranged to pass through the slot S9. After passing through the slot S9, the lead wire 62C is twisted into the single common wire together with the end portions of the conducting wires 60U and 60V below the slot S9.

In accordance with the winding patterns of the conducting wires 60A, the lead wires 62C of the conducting wires 60U, 60V, and 60W can be twisted together after being passed through the slot S9.

Figure 8:
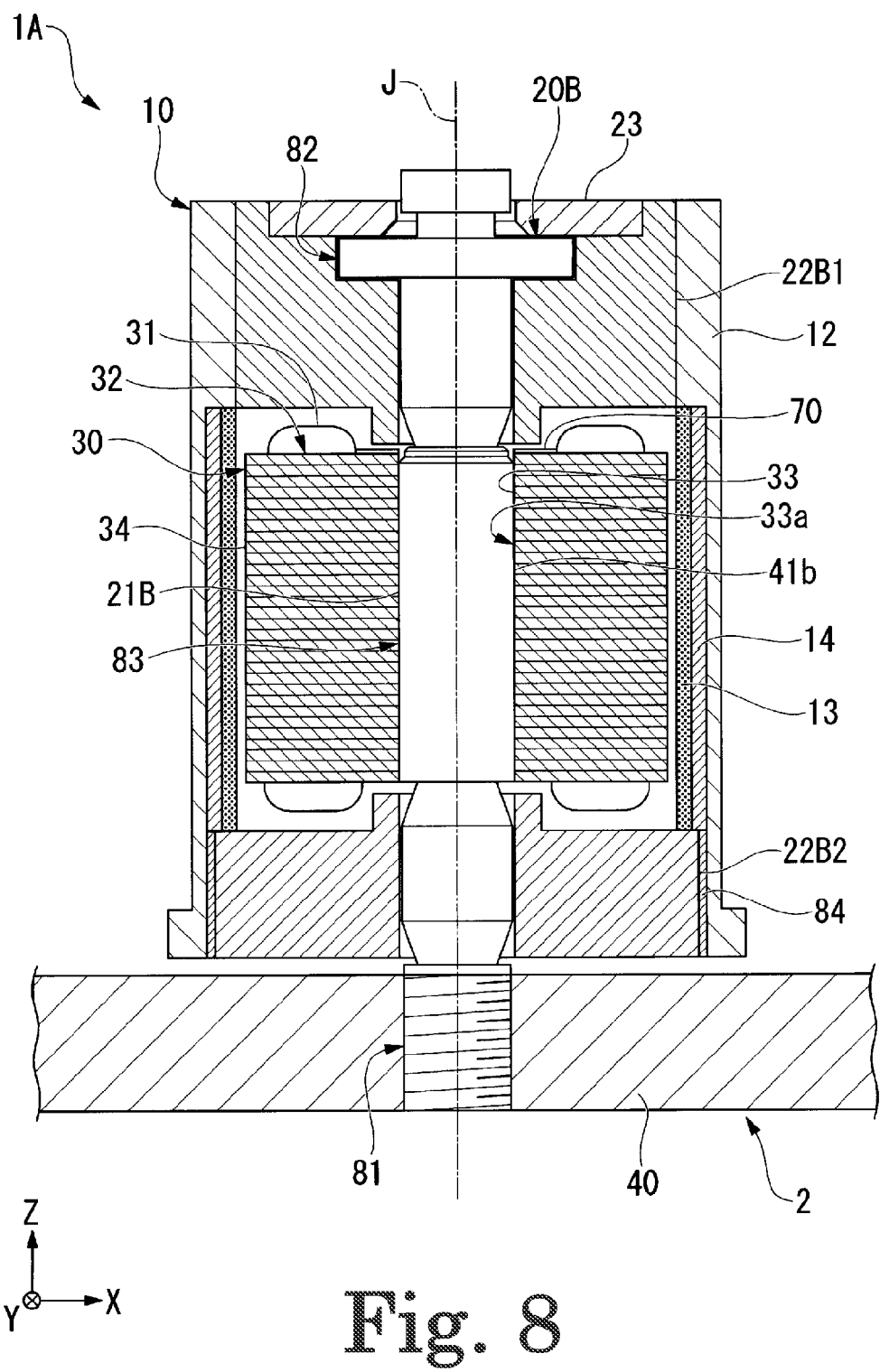
FIG. 8 is a vertical cross-sectional view illustrating a spindle motor according to another preferred embodiment of the present invention.

FIG. 8 is a vertical cross-sectional view illustrating a spindle motor 1A according to another preferred embodiment of the present invention.

Referring to FIG. 8, a stationary portion 2 of the spindle motor 1A includes an outside surface 41b, a base portion 40, and a shaft 21B. The shaft 21B is fixed to the base portion 40. The shaft 21B is arranged to extend in an axial direction. The shaft 21B includes a screw portion 81 fixed to the base portion 40, a thrust plate 82 arranged on an upper side of the screw portion 81, and a stator core support portion 83 arranged between the screw portion 81 and the thrust plate 82. The shaft 21B and sleeves 22B1 and 22B2 are arranged to together define a bearing portion 20B.

The sleeve 22B1 is arranged on an upper side of the stator core support portion 83. The sleeve 22B1 is fitted into a rotor hub 12. In addition, a thrust bushing 23, which is arranged opposite to an upper surface of the thrust plate 82, is fixed to the sleeve 22B1. Meanwhile, the sleeve 22B2 is arranged on a lower side of the stator core support portion 83. The sleeve 22B2 is fixed to the rotor hub 12 through an adhesive 84.

The shaft 21B and each of the sleeves 22B1 and 22B2 are arranged opposite to each other with a gap intervening therebetween. A lubricating oil or a gas is arranged in the gap. In addition, a yoke 14, which defines a magnetic path, is provided between the rotor hub 12 and a rotor magnet 13. The shaft 21B is arranged to extend in the axial direction, and includes the outside surface 41b. An inside surface 33a of a core back 33 is press fitted to the outside surface 41b of the shaft 21B.

A fixing member 70 may be defined by an adhesive or a sheet component, or may include a cap-like component, for example.

Note that features as described above may be combined appropriately as long as no conflict arises.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor comprising:
a stationary portion; and
a rotating portion arranged to rotate about a central axis extending in a vertical direction with respect to the stationary portion; wherein
the stationary portion includes:
a stator portion including a stator core including an annular core back and a plurality of tooth portions arranged to extend radially outward from the core back, and coils wound around the plurality of tooth portions;
an outside surface press fitted to an inside surface of the core back; and
a fixing member arranged at least on an upper surface of the core back;
conducting wires defining the coils include:
passage lines each of which is arranged to join different ones of the coils to each other; and
lead wires each of which is drawn out from one of the coils, and is drawn out from an upper side of upper surfaces of the tooth portions to a lower side of lower surfaces of the tooth portions;
each of the passage lines and the lead wires is arranged radially outward of the inside surface of the core back; and
the fixing member is arranged to fix at least a portion of each passage line and at least a portion of each lead wire to the stator core.

2. The spindle motor according to claim 1, wherein
each lead wire is drawn out from the upper side of the upper surfaces of the tooth portions to the lower side of the lower surfaces of the tooth portions at a radially inner end portion of one of the tooth portions; and
the fixing member is arranged to fix a radially inner end portion of each coil to the stator core.

3. The spindle motor according to claim 1, wherein
each passage line includes a first line portion arranged to pass only on the upper side of the upper surfaces of adjacent ones of the tooth portions, and a second line portion arranged to extend on both the upper side of the upper surfaces of adjacent ones of the tooth portions and the lower side of the lower surfaces of the adjacent ones of the tooth portions, and arranged to pass below the lower surface of one of the tooth portions; and
the fixing member is arranged to fix at least a portion of the first line portion to the stator core.

4. The spindle motor according to claim 3, wherein
the fixing member is made of a resin material;
the fixing member is arranged to extend from the upper surface of the core back to an outside surface of the core back; and
a top of a portion of the fixing member which is arranged above the upper surface of the core back is arranged at a level lower than that of an upper end portion of each coil.

5. The spindle motor according to claim 4, wherein
at least a portion of the first line portion is arranged radially outward of the outside surface of the core back; and
a portion of the fixing member is arranged in at least a portion of a gap defined between the outside surface of the core back and the first line portion.

6. The spindle motor according to claim 5, wherein the first line portion includes an angled portion arranged radially outward of the outside surface of the core back.

7. The spindle motor according to claim 1, wherein
the fixing member includes a sheet component; and
the sheet component is arranged to be in close contact with the upper surface of the core back and each passage line.

8. The spindle motor according to claim 1, wherein
the stationary portion further includes a base portion;
the base portion includes a tubular cylindrical portion arranged to extend in an axial direction of the central axis; and
the cylindrical portion includes the outside surface.

9. The spindle motor according to claim 1, wherein
the stationary portion further includes a base portion and a shaft fixed to the base portion; and
the shaft is arranged to extend in an axial direction of the central axis, and includes the outside surface.

10. A disk drive apparatus comprising:
the spindle motor of claim 1;
a disk supported by the spindle motor; and
an access portion arranged to perform at least one of reading and writing of information from or to the disk.

11. A spindle motor comprising:
a stationary portion; and
a rotating portion arranged to rotate about a central axis extending in a vertical direction with respect to the stationary portion; wherein
the stationary portion includes:
- a stator portion including a stator core including an annular core back and a plurality of tooth portions arranged to extend radially outward from the core back, and coils wound around the plurality of tooth portions;
- an outside surface press fitted to an inside surface of the core back; and
- a fixing member arranged at least on an upper surface of the core back;

conducting wires defining the coils include:
- passage lines each of which is arranged to join different ones of the coils to each other; and
- lead wires each of which is drawn out from one of the coils, and is drawn out from an upper side of upper surfaces of the tooth portions to a lower side of lower surfaces of the tooth portions;

each of the passage lines and the lead wires is arranged radially outward of the inside surface of the core back;
the fixing member is arranged to fix at least a portion of each passage line and at least a portion of each lead wire to the stator core;
each lead wire is drawn out from the upper side of the upper surfaces of the tooth portions to the lower side of the lower surfaces of the tooth portions at a radially inner end portion of one of the tooth portions; and
the fixing member is arranged to fix a radially inner end portion of each coil to the stator core.

12. The spindle motor according to claim 11, wherein
the fixing member includes a sheet component; and
the sheet component is arranged to be in close contact with the upper surface of the core back and each passage line.

13. A disk drive apparatus comprising:
the spindle motor of claim 11;
a disk supported by the spindle motor; and
an access portion arranged to perform at least one of reading and writing of information from or to the disk.

14. A spindle motor comprising:
a stationary portion; and
a rotating portion arranged to rotate about a central axis extending in a vertical direction with respect to the stationary portion; wherein
the stationary portion includes:
- a stator portion including a stator core including an annular core back and a plurality of tooth portions arranged to extend radially outward from the core back, and coils wound around the plurality of tooth portions;
- an outside surface press fitted to an inside surface of the core back; and
- a fixing member arranged at least on an upper surface of the core back;

conducting wires defining the coils include:
- passage lines each of which is arranged to join different ones of the coils to each other; and
- lead wires each of which is drawn out from one of the coils, and is drawn out from an upper side of upper surfaces of the tooth portions to a lower side of lower surfaces of the tooth portions;

each of the passage lines and the lead wires is arranged radially outward of the inside surface of the core back;
the fixing member is arranged to fix at least a portion of each passage line and at least a portion of each lead wire to the stator core;
each passage line includes a first line portion arranged to pass only on the upper side of the upper surfaces of adjacent ones of the tooth portions, and a second line portion arranged to extend on both the upper side of the upper surfaces of adjacent ones of the tooth portions and the lower side of the lower surfaces of the adjacent ones of the tooth portions, and arranged to pass below the lower surface of one of the tooth portions; and
the fixing member is arranged to fix at least a portion of the first line portion to the stator core.

15. The spindle motor according to claim 14, wherein
the fixing member is made of a resin material;
the fixing member is arranged to extend from the upper surface of the core back to an outside surface of the core back; and
a top of a portion of the fixing member which is arranged above the upper surface of the core back is arranged at a level lower than that of an upper end portion of each coil.

16. The spindle motor according to claim 15, wherein
at least a portion of the first line portion is arranged radially outward of the outside surface of the core back; and
a portion of the fixing member is arranged in at least a portion of a gap defined between the outside surface of the core back and the first line portion.

17. The spindle motor according to claim 16, wherein the first line portion includes an angled portion arranged radially outward of the outside surface of the core back.

18. The spindle motor according to claim 14, wherein
the fixing member includes a sheet component; and
the sheet component is arranged to be in close contact with the upper surface of the core back and each passage line.

19. A disk drive apparatus comprising:
the spindle motor of claim 18;
a disk supported by the spindle motor; and
an access portion arranged to perform at least one of reading and writing of information from or to the disk.

* * * * *